US008655031B2

(12) United States Patent
Read et al.

(10) Patent No.: US 8,655,031 B2
(45) Date of Patent: Feb. 18, 2014

(54) VIDEO CONTENT IDENTIFICATION USING SCENE CHANGE SIGNATURES FROM DOWNSCALED IMAGES

(75) Inventors: Chris Read, San Diego, CA (US); Robert Hardacker, Escondido, CA (US); Brant Candelore, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1324 days.

(21) Appl. No.: 11/692,166

(22) Filed: Mar. 27, 2007

(65) Prior Publication Data
US 2008/0239159 A1    Oct. 2, 2008

(51) Int. Cl.
*G06K 9/00*    (2006.01)
(52) U.S. Cl.
USPC ........ 382/119; 348/553; 348/701; 345/472.1; 345/472; 345/660; 382/298; 725/19
(58) Field of Classification Search
USPC ........... 725/19, 14, 9; 715/723; 348/558, 578, 348/700, 701; 382/119; 345/472.1, 472, 345/660
See application file for complete search history.

(56) References Cited

U.S. PATENT DOCUMENTS

| 6,507,615 | B1 * | 1/2003 | Tsujii et al. | 375/240.04 |
|---|---|---|---|---|
| 7,671,924 | B2 * | 3/2010 | Chao et al. | 348/581 |
| 2002/0191112 | A1 * | 12/2002 | Akiyoshi et al. | 348/700 |
| 2003/0090505 | A1 * | 5/2003 | McGee et al. | 345/721 |
| 2005/0204398 | A1 * | 9/2005 | Ryal | 725/112 |
| 2005/0210388 | A1 * | 9/2005 | Matsumoto | 715/719 |
| 2006/0059510 | A1 * | 3/2006 | Huang et al. | 725/32 |
| 2006/0271947 | A1 | 11/2006 | Lienhart et al. | |

FOREIGN PATENT DOCUMENTS

WO    WO 2007066924 A1 *    6/2007

OTHER PUBLICATIONS

Hampapur, Arun, et al., Comparison of Sequence Matching Techniques for Video Copy Detection Mode, Proceedings of the SPIE Conference on Storage and Retrieval for Media Databases, San Jose, CA, USA, 2002, 8 pages.
Indyk, Piotr, et al., Finding Pirated Video Sequences on the Internet, Paper No. 199, Stanford Infolab Technical Report, Feb. 1999, pp. 1-24.

* cited by examiner

*Primary Examiner* — Jefferey Harold
*Assistant Examiner* — Omer Khalid
(74) *Attorney, Agent, or Firm* — Blakely, Sokoloff, Taylor & Zafman LLP

(57) ABSTRACT

Apparatus for identifying video content includes a scene detector to detect a plurality of consecutive scenes in the video content. The video content may include a video program and an advertisement contained within the video program. A signature generator determines a scene change signature for each of the plurality of consecutive scenes. A content identifier provides the plurality of scene change signatures to a comparator that compares the plurality of scene change signatures to a database having a plurality of video content items to identify the video program. The database includes an ordered plurality of previously determined scene change signatures for each item of video content in the database. The content identifier receives an identification of the video content from the comparator. The content identifier may further receive information related to a position of the plurality of scene change signatures within the ordered plurality of previously determined scene change signatures.

27 Claims, 3 Drawing Sheets

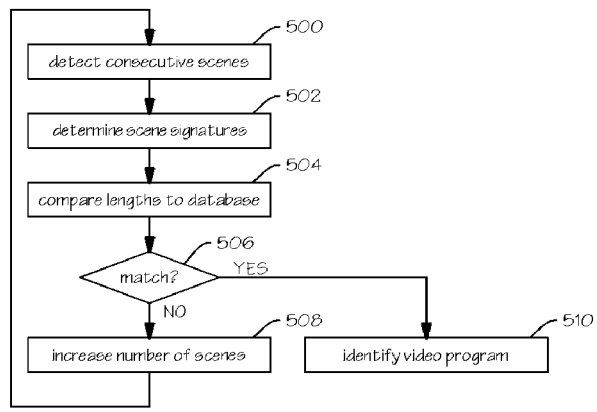
FIG. 5
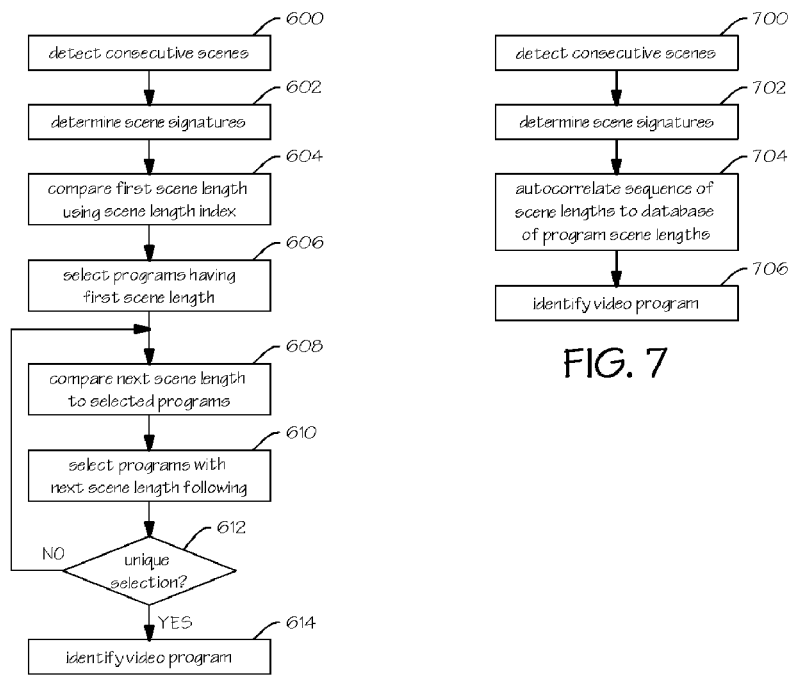
FIG. 6
FIG. 7

VIDEO CONTENT IDENTIFICATION USING SCENE CHANGE SIGNATURES FROM DOWNSCALED IMAGES

BACKGROUND

Video programs may be received by a variety of devices for display or storage. It may be desirable to display information about or related to the received video program. However, the receiving device may receive the video program as streaming compressed or decompressed content without any metadata that provides information about the content such as the title of the video program.

An example of such content delivery would be the delivery of content to a television monitor by a cable set top box. The cable set top box may provide the video content via an analog or digital signal connection that provides for the delivery of content but not associated identifying data. As the cable set top box may handle interaction with the viewer to select the content, the television monitor may be completely deprived of any information about the content being displayed.

It would be useful to provide an apparatus and a method that allows a receiving device to identifying a video content from the program content.

SUMMARY

Apparatus for identifying video content includes a scene detector to detect a plurality of consecutive scenes in the video content. The video content may include a video program and an advertisement contained within the video program. A signature generator determines a scene change signature for each of the plurality of consecutive scenes. A content identifier provides the plurality of scene change signatures to a comparator that compares the plurality of scene change signatures to a database having a plurality of video content items to identify the video program. The database includes an ordered plurality of previously determined scene change signatures for each item of video content in the database. The content identifier receives an identification of the video content from the comparator. The content identifier may further receive information related to a position of the plurality of scene change signatures within the ordered plurality of previously determined scene change signatures.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 5 is a flowchart of a method that embodies the invention.

FIG. 6 is a flowchart of another method that embodies the invention.

FIG. 7 is a flowchart of another method that embodies the invention.

DETAILED DESCRIPTION

Figure 1:
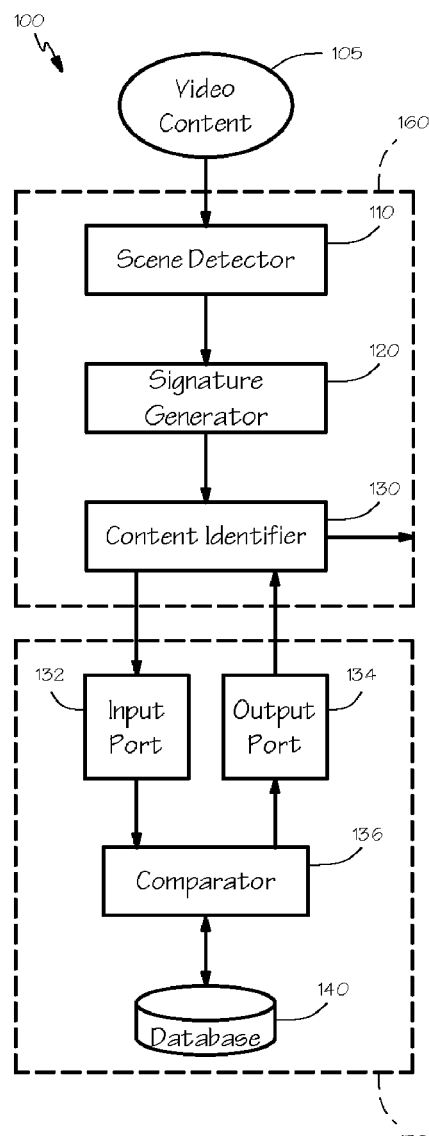
FIG. 1 is a block diagram of a device that embodies the invention.

FIG. 1 shows a block diagram of an apparatus 100 that may be used for identifying video content 105. A scene detector 110 receives the video content 105 to detect a plurality of consecutive scenes in the video content. The scene detector 110 may identify boundaries between scenes by any of a variety of methods. For example, boundaries of the scenes may be detected when more than a predetermined number of pixels change value. It will be appreciated that some scene changes may be difficult to detect. The scene detector 110 need not detect every scene change. It is more important that the scene detector 110 detect scenes consistently so that the same scene changes are detected each time the same video content is analyzed. It will be appreciated that minor variations in a video content may occur in different transmissions and that the scene detector 110 may not detect scenes with perfect consistency between different transmissions.

A signature generator 120 receives the scene change indications from the scene detector 110 to determine a scene change signature for each of the plurality of consecutive scenes. Each scene change signature includes a downscaled image that immediately follows a scene change in the video content. It would be possible to identify video content using a plurality of complete images that follow a like plurality of scene changes. However, the amount of information required to represent a single image is large and it is unwieldy to use that amount of information for identification purposes. Further, the information in a complete image may be largely redundant as much of it provides for the shading of the image rather than defining the distinctive content of the image. Thus the image is downscaled to provide a balance between the size of a scene change signature and the amount of unique information included for identifying the content. It is desirable to choose a downsizing method that provides a relative uniform distribution of all possible values for the downsized image, making the downsizing comparable to a hashing function for the image.

The downscaling may use any of a variety of methods to reduce the amount of information in the signature as compared to the amount of information in the original image. For example, the downscaling may be determined as every mth pixel in the horizontal direction and every nth in the vertical direction, where m and n may be the same or different. It may be desirable to choose m and n as integer divisors of the original image dimensions. For example, possible values of m and n for a 1920 by 1080 image include 120, 60, 40, 30, 24, and so on. Other methods of downscaling include eliminating or reducing the precision of one or more of the chroma (UV) and/or luma (Y) values.

A content identifier 130 receives the scene change signatures from the signature generator 120 to provide the plurality of scene change signatures to a comparator 136. An input port 132 may couple the content identifier 130 to the comparator 136. The comparator 136 compares the plurality of scene change signatures to a database 140 having a plurality of video content items. The database 140 includes previously determined scene change signatures for each video content item in the database.

If the comparator 136 matches the plurality of scene change signatures to a sequence of previously determined scene change signatures, the video content 105 is identified as being from the video content item containing the matching sequence. The identification of the video content 105 is received by the content identifier 130 from the comparator 136. An output port 132 may couple the comparator 136 to the content identifier 130. The identification of the video content may be provided by the content identifier 130 to any of a variety of related devices, such as a display unit to display the identity of the video content or to display related information or additional related content.

Matching the plurality of scene change signatures to a sequence of previously determined scene change signatures may or may not be by arithmetic equality. Autocorrelation may be used for the matching to provide a statistical approach that allows for variation of exact measurements in favor of a probability approach. Matching by autocorrelation may be expressed in terms of a confidence that the sequences of scene change signatures come from the same source.

The apparatus 100 may be part of a single device such as a television monitor or a video recorder. In such embodiments, the contents of the database may be provided to the apparatus by any of a variety of means such as interleaved with the video content or by a separate link to a data provider which may be continuously or intermittently connected.

In some embodiments a first apparatus 160 and a second apparatus 170 may work cooperatively to identify video content as suggested by the dashed boxes in FIG. 1. The first apparatus 160 may generate the plurality of scene change signatures and provide them to the second apparatus 170 for identification. The first apparatus 160 may be part of a device that receives video content such as a television monitor or a video recorder. The second apparatus 170 may be remote from the first apparatus 160 and may be coupled to the first apparatus by a network connection. The network connection may be shared with the connection that delivers the video content or may be an independent network connection such as an internet connection.

Figure 2:
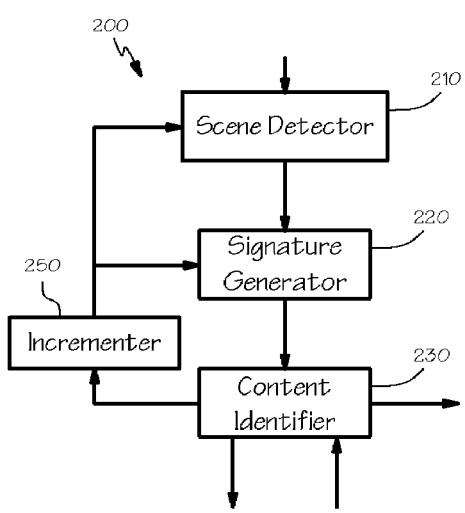
FIG. 2 is a block diagram of another device that embodies the invention.

A sequence of scene change signatures provides a "fingerprint" of the video program that can be used to identify the program. It will be appreciated that some sequences may need to be longer than others before the sequence uniquely identifies a video program in the database 140. In one embodiment as shown in FIG. 2, an incrementer 250 may receive a signal from the content identifier 130 and cause the scene detector 110 and the signature generator 120 to increase the number of consecutive scenes in the sequence of detected scene change signatures. The incrementer 250 may increase the number of consecutive scenes until comparing the scene change signatures to the database 140 of video programs uniquely identifies the video program. The content identifier 230 may provide the signal to increase the number of consecutive scenes in response to receiving an indication that no video content was uniquely identified by the comparator 136.

Figure 3:
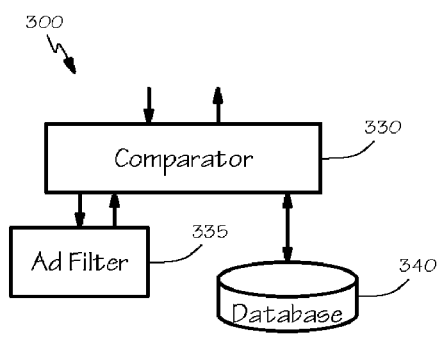
FIG. 3 is a block diagram of another device that embodies the invention.

The video program may include inserted advertisements. In one embodiment as shown in FIG. 3, an ad filter 335 works cooperatively with the comparator 330 to identify and exclude scene change signatures associated with the insertion of an advertisement. This may allow an identifiable sequence of scene change signatures to be generated despite the insertion of an advertisement.

In another embodiment, the ad filter may identify and exclude scene change signatures associated with the insertion of an advertisement before it is received by the comparator. In another embodiment, the ad filter may identify and exclude scene change signatures associated with the insertion of an advertisement by discarding all scene change information collected and restarting the acquisition of an identifiable sequence of scene change signatures when the end of the inserted commercial messages is detected.

In another embodiment, the ad filter 315 may identify and exclude scene change signatures not associated with the insertion of an advertisement. This may allow an identifiable sequence of scene change signatures to be generated to identify the advertisement. Identification of the advertisement may allow delivery of related content which may be video content and/or other types of content.

Figure 4A:
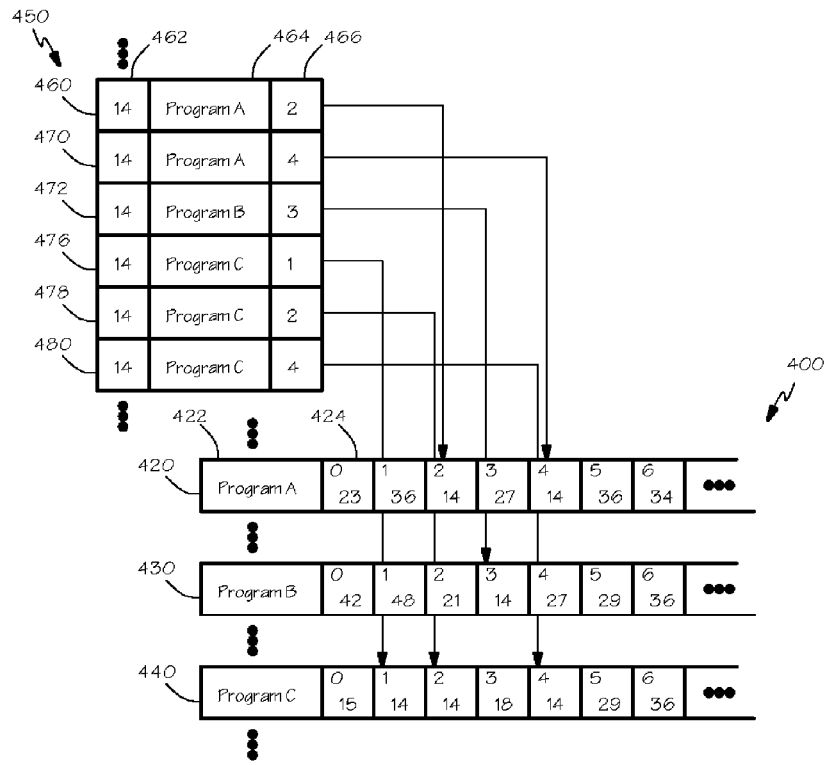
FIG. 4A is a diagram of a database structure that may be used with the invention.

FIG. 4A illustrates a database structure that may be used to identify a video program from a sequence of scene change signatures. The database structure may provide a table 400 of program entries 420, 430, 440. Each program entry 420 may include program identification data 422 and a sequence of scene change signatures 424 for the identified program. The database structure may further provide an index 450 of scene change signatures to identify scenes in programs having a given scene change signature. An entry 460 in the index 450 may include an indexed scene change signature 462, a program pointer 464, and a scene offset 466. The entries in the index may be sorted by the indexed scene change signature 462.

The comparator 130 may include a first search engine that uses the index 450 to identify a first plurality of scenes from video programs in the database 400 based on the first scene change signature. As illustrated by FIG. 4A, if the first scene change signature in a sequence of scene change signatures is 14, the index 450 provides pointers to six scenes in three video programs:

Program A, scene 2
Program A, scene 4
Program B, scene 3
Program C, scene 1
Program C, scene 2
Program C, scene 4

Figure 4B:
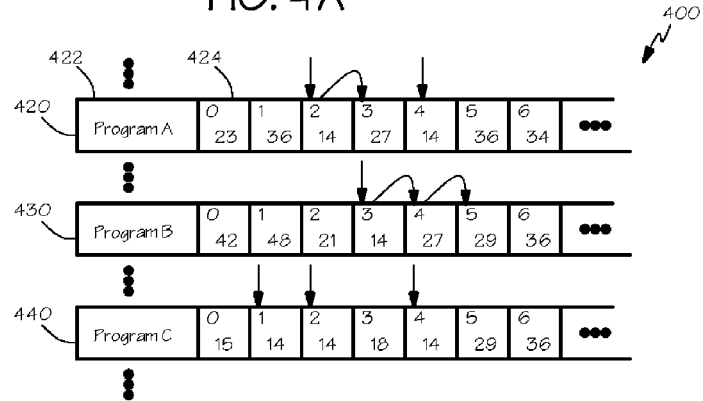
FIG. 4B is a diagram of a portion of the database structure illustrating another aspect of its use.

The comparator may further include a second search engine to compare a second scene change signature for a consecutively following scene for each of the identified plurality of video content from the database. As shown in FIG. 4B, if the second scene change signature for the second scene is 27, the second search engine identifies Program A, scene 3 and Program B, scene 3 as matches from the group identified by the first search engine. The sequence of scene change signatures 424 for each program entry 420 may be ordered consecutively to facilitate retrieval of the second scenes for comparison.

The comparator may use the second search engine to compare successive scene change signatures for consecutively following scenes for each of the plurality of video content from the database identified by the preceding scene change signature. Successive scenes may be compared until a unique video content is identified and/or until all provided scene change signatures have been compared. In one embodiment, scene change signature comparison continues even after a unique video content is identified to confirm the identification. If comparison of the provided scene change signatures does not identify a unique video content, an indication that no video content was uniquely identified by the comparator 136 may be provided.

As shown in FIG. 4B, if the third scene change signature for the third scene is 29, the third search engine identifies Program B, scene 4 as a unique match from the group identified by the second search engine. Program B would be identified based on the scene change signature sequence of 14, 27, and 29. The program identification may be displayed to a user, stored in a location for use by other devices, transmitted to a device for use, or otherwise put into a tangible form for use.

If the third scene change signature for the third scene was 36, then there is no matching sequence and the indication that no video content was uniquely identified by the comparator 136 may be provided. If only two scene change signatures were provided in this example, 14 and 27, then there would be two matching sequences and the indication that no video content was uniquely identified by the comparator 136 could be provided. It will be appreciated that the indication that no video content was uniquely identified might further indicate whether there were no matching sequences or more than one matching sequence. The indication might be the number of matching sequences found. The mechanism 200 shown in FIG. 2 for increasing the number of scenes detected may be responsive to the number of matching sequences found and provide a greater increase in scenes detected when the number of matching sequences found is large.

If the sequence of scene change signatures 424 for each program entry 420 are ordered consecutively and data is included in the database 400 that indicates the temporal position of each scene change signature 424 in the identified program 422, then the matching of the sequence of scene change signatures may substantially identify the temporal position in the video content. The output port 134 in FIG. 1 may provide information related to the temporal position of the plurality of scene change signatures within the plurality of previously determined scene change signatures for the identified video content. In some embodiments, the identity of the video content may be known and provided with the plurality of scene change signatures so that the comparator only compares the provided scene change signatures to the entry for the identified video content. For example, the video content may have been previously identified and the scene change signatures may be provided only to obtain an updated temporal position.

The sequence of scene change signatures in a video program may be viewed as a frequency modulated signal of finite length modulated by the scene change signatures. Autocorrelation techniques may be used to determine if a sample of scene change signatures from the received video program is from a given video program. The comparator may include a digital signal processor to test for autocorrelation between a sequence of scene change signatures for the plurality of consecutive scenes and a sequence of previously determined scene change signatures for each video program in the database to identify the video program.

The comparator may use autocorrelation to compute a degree of confidence (threshold) for a comparison between a scene change signature to be identified and a previously determined scene change signature. The result may be similar with a specific "confidence factor," which may be expressed as a difference between the two signatures. For example, the difference between the signatures may be determined as a sum of the squares of the differences between corresponding pixels in the two signatures. Comparison of successive scene change signatures may increase the confidence of a match if the successive comparisons continue to be similar with a specific "confidence factor."

It is possible that the sequence of scene change signatures may fail to match any sequence of scene change signatures 424 in the database 400. The failure to match may be the result of trying to identify a program that is not in the database or the result of some error in the generation of the sequence of scene change signatures. A matching failure may initiate the generation of a new sequence of scene change signatures to retry identification of the video program.

FIG. 5 is a flowchart for a method of identifying a video program that embodies the invention. A plurality of consecutive scenes in the video program are detected 500. The boundaries of the scenes may be detected when more than a predetermined number of pixels change value. In some embodiments, scenes associated with advertisements are identified and excluded from the detected plurality of consecutive scenes in the video program. In other embodiments, the advertisements themselves are considered targets for identification. By knowing when an ad is playing, it is possible to obtain metadata for that ad.

A scene change signature for each of the plurality of consecutive scenes is determined 502. The scene change signatures may be determined by downscaling or subsampling the image that immediately follows a scene change. The scene change signatures are compared to a database of video programs that includes previously determined scene change signatures for each video program in the database 504. If there is a unique match between the detected scene change signatures and a sequence of previously determined scene change signatures for a video program 506-Yes, that video program is identified by the detected scene change signatures 510.

In some embodiments, a single device, such as a television monitor or a video recorder, performs the entire method. In other embodiments, two devices may work cooperatively to perform the method. The first device may detect the scenes 502 and determine the plurality of scene change signatures 504 and provide them to the second device for identification 504, 506. The first device may be a device that receives video content such as a television monitor or a video recorder. The second device may be remote from the first device and may be coupled to the first apparatus by a network connection. The network connection may be shared with the connection that delivers the video content or may be an independent network connection such as an internet connection.

In some embodiments, the comparison may be based on the sum of the squares of the differences (SSOD) between corresponding pixels in the detected scene change signature and the predetermined scene change signature. A match may be detected if the SSOD is below a predetermined threshold for each of the detected scene change signatures.

In some embodiments, if scene change signature comparison does not uniquely match a video program 506-No, the number of consecutive scenes to detect is increased 508, and the method is repeated until comparing the scene change signatures to the database of video programs 506 uniquely identifies the video program 510.

FIG. 6 is a flowchart for another method of identifying a video program that embodies the invention. A plurality of consecutive scenes in the video program are detected 600. A scene change signature for each of the plurality of consecutive scenes is determined 602. A scene change signature for a first scene is compared to the database of video programs using a first index that is sorted by scene change signatures 604 to identify a first plurality of video programs in the database 606.

A scene change signature for a scene that consecutively follows is compared to the predetermined scene change signature that follows the scene that was used to select video programs from the database 608. Predetermined scene change signatures for video programs may be stored in consecutive order in the database. The video programs that match are selected as a subset of the previously selected video programs 610. Successive scene change signatures are compared to further select video programs from the previously selected video programs 612-No until a video program is uniquely identified 612-Yes, 614.

FIG. 7 is a flowchart for another method of identifying a video program that embodies the invention. A plurality of consecutive scenes in the video program are detected 700. A scene change signature for each of the plurality of consecutive scenes is determined 702. Autocorrelation between a sequence of scene change signatures for the plurality of consecutive scenes and a sequence of previously determined scene change signatures for each video program in a database is tested 704. The video program having the greatest autocorrelation is identified as the source of the detected consecutive scenes 706. A digital signal processor may be used to test for autocorrelation between the sequence of scene change signatures for the plurality of consecutive scenes and the sequence of previously determined scene change signatures for each video program in the database.

The sequence of scene change signatures for each program entry may be ordered consecutively and may include the temporal position of each scene change signature in the identified program. Matching of the sequence of scene change signatures may substantially identify the temporal position in the video content. Information related to the temporal position of the plurality of scene change signatures in the identified video content may be provided. In some embodiments, the identity of the video content may be known and provided with the plurality of scene change signatures to determine the temporal position within the given video content. For example, the video content may have been previously identified and the scene change signatures may be provided only to obtain an updated temporal position.

The invention described herein may be embodied in specific hardware components that contain hardwired logic for performing the operations. Alternatively, program instructions may be used to cause a functional change in a general-purpose or special-purpose processing system that is programmed with the instructions, or any combination of programmed computer components and custom hardware components, to perform functions that embody the invention.

The invention described herein may be embodied in an article of manufacture that provides information in a form readable by a computer. The term "computer" as used in this description is intended to include any device or machine whose function can be altered by the receipt of information. Computers include, but are not limited to, central processing units, processors, controllers, and programmable arrays. When read by a computer, the information provided by the article of manufacture causes a functional change in the computer such that the computer performs functions and produces tangible results as determined by the information. The article of manufacture or the information it provides may be referred to as software, firmware, program, procedure, process, application, logic, and so on. Software, or any equivalent term, may be said to perform a function or produce a result meaning that when a computer reads the information that represents the software, the functional change in the computer causes the computer to perform a function or produce a result.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus for identifying video content, the apparatus comprising:
    an input port to receive a plurality of consecutive scene change signatures, each scene change signature including a downscaled image that immediately follows a scene change in the video content;
    a comparator that determines an identification of the video content by matching the plurality of consecutive scene change signatures to a database having a plurality of video content items, the database including previously determined scene change signatures for each scene change of each item of video content in the database, and
    an output port to provide the identification of the video content from the comparator.

2. The apparatus of claim 1 wherein the video content includes a video program and an advertisement contained within the video program, the apparatus further comprising an ad filter to identify and exclude scene change signatures associated with the advertisement from the plurality of consecutive scene change signatures compared to the database such that the plurality of consecutive scene change signatures compared is from the video program and the identification of the video content is an identification of the video program.

3. The apparatus of claim 1 wherein the video content includes a video program and an advertisement contained within the video program, the apparatus further comprising an ad filter to identify and exclude scene change signatures associated with the video program from the plurality of consecutive scene change signatures compared to the database such that the plurality of consecutive scene change signatures compared is from the advertisement and the identification of the video content is an identification of the advertisement.

4. The apparatus of claim 1 wherein the previously determined scene change signatures for each scene change of each item of video content in the database are arranged in a temporally consecutive order and the output port further provides information related to a temporal position of the plurality of consecutive scene change signatures within the plurality of previously determined scene change signatures for the identified video content.

5. The apparatus of claim 1 wherein the comparator further comprises:
    a first search engine to compare a first scene change signature from the plurality of consecutive scene change signatures to the database using a first index that is sorted by scene change signature values to select a first plurality of video content in the database; and
    a second search engine to compare a second scene change signature for a consecutively following scene for each of the identified plurality of video content from the database to select a second plurality of video content from the previously selected plurality of video content until a single video content is uniquely selected.

6. The apparatus of claim 5 wherein the output port further provides an indication if no video content is uniquely identified by the plurality of consecutive scene change signatures.

7. The apparatus of claim 1 wherein the comparator includes a digital signal processor to test for autocorrelation between a sequence of scene change signatures for the plurality of consecutive scenes and a sequence of previously determined scene change signatures for each item of video content in the database.

8. An apparatus for identifying video content, the apparatus comprising:
    a scene detector to detect a plurality of consecutive scenes in the video content;
    a signature generator to determine a scene change signature for each of the plurality of consecutive scenes, each scene change signature including a downscaled image that immediately follows a scene change in the video content; and
    a content identifier to provide a plurality of scene change signatures to a comparator that compares the plurality of consecutive scene change signatures to a database having a plurality of video content items, the database including previously determined scene change signatures for each scene change of each item of video content in the database, and to receive an identification of the video content from the comparator.

9. The apparatus of claim 8 further comprising an incrementer to increase a number of consecutive scenes in the plurality of consecutive scenes if the content identifier does not receive the identification of the video content from the comparator.

10. The apparatus of claim 8 wherein the video content includes a video program and an advertisement contained within the video program, the apparatus further comprising an ad filter to identify and exclude scene change signatures associated with the advertisement from the plurality of consecutive scene change signatures compared to the database such that the plurality of consecutive scene change signatures compared is from the video program and the identification of the video content is an identification of the video program.

11. The apparatus of claim 8 wherein the video content includes a video program and an advertisement contained within the video program, the apparatus further comprising an ad filter to identify and exclude scene change signatures associated with the video program from the plurality of consecutive scene change signatures compared to the database such that the plurality of consecutive scene change signatures compared is from the advertisement and the identification of the video content is an identification of the advertisement.

12. The apparatus of claim 8 wherein the content identifier further receives information related to a temporal position of the plurality of consecutive scene change signatures within the plurality of previously determined scene change signatures for the identified video content.

13. A method for identifying video content, the method comprising:

receiving a plurality of consecutive scene change signatures, each scene change signature including a downscaled image that immediately follows a scene change in the video content;

determining an identification of the video content by matching the plurality of consecutive scene change signatures to a database having a plurality of video content items, the database including previously determined scene change signatures for each scene change of each item of video content in the database, and providing the identification of the video content from the comparator.

14. The method of claim 13 wherein the video content includes a video program and an advertisement contained within the video program, the apparatus further comprising an ad filter to identify and exclude scene change signatures associated with the advertisement from the plurality of consecutive scene change signatures compared to the database such that the plurality of consecutive scene change signatures compared is from the video program and the identification of the video content is an identification of the video program.

15. The method of claim 13 wherein the video content includes a video program and an advertisement contained within the video program, the apparatus further comprising an ad filter to identify and exclude scene change signatures associated with the video program from the plurality of consecutive scene change signatures compared to the database such that the plurality of consecutive scene change signatures compared is from the advertisement and the identification of the video content is an identification of the advertisement.

16. The method of claim 13 wherein the previously determined scene change signatures for each scene change of each item of video content in the database are arranged in a temporally consecutive order and the output port further provides information related to a temporal position of the plurality of consecutive scene change signatures within the plurality of previously determined scene change signatures for the identified video content.

17. The method of claim 13 wherein the comparator further comprises:

comparing a first scene change signature from the plurality of consecutive scene change signatures to the database using a first index that is sorted by scene change signature values to select a first plurality of video content in the database; and comparing a second scene change signature for a consecutively following scene for each of the identified plurality of video content from the database to select a second plurality of video content from the previously selected plurality of video content until a single video content is uniquely selected.

18. The method of claim 17 wherein the output port further provides an indication if no video content is uniquely identified by the plurality of consecutive scene change signatures.

19. The method of claim 13 wherein the comparator includes a digital signal processor to test for autocorrelation between a sequence of scene change signatures for the plurality of consecutive scenes and a sequence of previously determined scene change signatures for each item of video content in the database.

20. A method for identifying video content, the apparatus comprising:

a scene detector to detect a plurality of consecutive scenes in the video content;

a signature generator to determine a scene change signature for each of the plurality of consecutive scenes, each scene change signature including a downscaled image that immediately follows a scene change in the video content; and a content identifier to provide a plurality of scene change signatures to a comparator that compares the plurality of consecutive scene change signatures to a database having a plurality of video content items, the database including previously determined scene change signatures for each scene change of each item of video content in the database, and to receive an identification of the video content from the comparator.

21. The method of claim 20 further comprising an incrementer to increase a number of consecutive scenes in the plurality of consecutive scenes if the content identifier does not receive the identification of the video content from the comparator.

22. The method of claim 20 wherein the video content includes a video program and an advertisement contained within the video program, the apparatus further comprising an ad filter to identify and exclude scene change signatures associated with the advertisement from the plurality of consecutive scene change signatures compared to the database such that the plurality of consecutive scene change signatures compared is from the video program and the identification of the video content is an identification of the video program.

23. The method of claim 20 wherein the video content includes a video program and an advertisement contained within the video program, the apparatus further comprising an ad filter to identify and exclude scene change signatures associated with the video program from the plurality of consecutive scene change signatures compared to the database such that the plurality of consecutive scene change signatures compared is from the advertisement and the identification of the video content is an identification of the advertisement.

24. The method of claim 20 wherein the content identifier further receives information related to a temporal position of the plurality of consecutive scene change signatures within the plurality of previously determined scene change signatures for the identified video content.

25. A method for identifying a temporal position in video content, the method comprising:
 receiving a plurality of consecutive scene change signatures substantially at the temporal position in the video content;
 matching the plurality of scene change signatures to a database having a plurality of previously determined scene change signatures arranged in a temporally consecutive order for each scene of the video content; and
 providing information related to the temporal position of the plurality of scene change signatures within the plurality of previously determined scene change signatures for the video content.

26. The method of claim 25 further comprising:
 comparing a first scene change signature from the plurality of consecutive scene change signatures to the database using a first index that is sorted by scene change signature values to select a first plurality of video content in the database; and
 comparing a second scene change signature for a consecutively following scene for each of the identified plurality of video content from the database to select a second plurality of video content from the previously selected plurality of video content until a single video content is uniquely selected, the previously determined scene change signatures for each video content in the database being arranged in a temporally consecutive order.

27. The method of claim 25 matching the plurality of scene change signatures to a database includes testing for autocorrelation between a sequence of change signatures for the plurality of consecutive scenes and a sequence of previously determined change signatures for each item of video content in the database.

* * * * *